United States Patent [19]

Baxmann et al.

[11] 4,011,384
[45] Mar. 8, 1977

[54] PROCESS FOR THE PRODUCTION OF CRYSTALLINE TERPOLYMERS OF ETHENE, BUTENE-1 AND BUTENE-2

[75] Inventors: Fritz Baxmann; Johann Dietrich; Walter Dittmann; Albert Frese, all of Marl, Germany

[73] Assignee: Chemische Werke Huls Aktiengesellschaft, Marl, Germany

[22] Filed: June 10, 1975

[21] Appl. No.: 585,698

[30] Foreign Application Priority Data

June 29, 1974 Germany .......................... 2431353

[52] U.S. Cl. .............................. 526/158; 526/350
[51] Int. Cl.² ................................. C08F 210/08
[58] Field of Search ................... 260/80.78, 88.2 R; 526/158, 350

[56] References Cited

UNITED STATES PATENTS

| | | | |
|---|---|---|---|
| 2,953,552 | 9/1960 | Stampa | 260/88.2 R |
| 3,067,184 | 12/1962 | Cines | 260/88.2 R |
| 3,491,073 | 1/1970 | Marinak | 260/80.78 |
| 3,509,116 | 4/1970 | Cote | 260/88.2 R |
| 3,645,992 | 2/1972 | Elston | 260/80.78 |
| 3,666,736 | 5/1972 | Hogan | 260/88.2 R |
| 3,705,884 | 12/1972 | Frese | 260/88.2 R |
| 3,725,364 | 4/1973 | Wagensommer | 260/80.78 |
| 3,920,621 | 11/1975 | Baxmann | 526/159 |

FOREIGN PATENTS OR APPLICATIONS 967,788   8/1964   United Kingdom

*Primary Examiner*—Paul R. Michl
*Attorney, Agent, or Firm*—Millen & White

[57] ABSTRACT

For preparing crystalline, thermoplastic, low-pressure terpolymers of ethene with 0.1–5 mol % butene-1 and 0.1–3 mol % butene-2 having a density of 0.94–0.96 g./cm³, a liquid phase monomer mixture consisting essentially of ethene, 0.05–10 mol % butene-1 and 20–98.9 mol % butene-2 is polymerized with a mixed polymerization catalyst comprising (a) $TiCl_3 \cdot nAlCl_3$ wherein $n$ is 0.2–0.6, and (b) isoprenylaluminum in a molar ratio Al : Ti of about 2–20 to form said terpolymer.

5 Claims, No Drawings

PROCESS FOR THE PRODUCTION OF CRYSTALLINE TERPOLYMERS OF ETHENE, BUTENE-1 AND BUTENE-2

BACKGROUND OF THE INVENTION

This invention relates to a process for the production of crystalline, thermoplastic, high density, low-pressure terpolymers of ethene, butene-1, and butene-2 by the polymerization of ethene in a liquid hydrocarbon phase containing butene-1 and butene-2 with a mixed catalyst of titanium trichloride and an organoaluminum compound.

The polymerization of ethene in $C_4$-cuts containing butene-1 and butene-2 with catalysts of titanium trichloride and chlorine-containing organoaluminum compounds is known, e.g., from DOS German unexamined laid-open application No. 2,214,271 and corresponding copending, commonly assigned U.S. Pat. No. 3,920,621 issued Nov. 18, 1975, the contents of which are incorporated by reference herein. However, in this process, no co- or terpolymers with butene-2 are obtained. According to another process described in German patent application No. P 23 50 065.4 and corresponding copending, commonly assigned U.S. patent application Ser. No. 511,130 filed Oct. 2, 1974, the contents of which are incorporated by reference herein, co- and terpolymers of ethylene, wherein likewise no butene-2 is incorporated, are obtained in $C_4$- and/or $C_3/C_4$-cuts which contain butene-2, with catalysts of titanium trichloride and trialkyl aluminum compounds.

The preparation of copolymers of ethene with 2-olefins has been described, e.g., in British Pat. No. 932,658, and the production of co- and terpolymers of ethene with 1-olefins and 2-olefins has also been disclosed, e.g., in British Pat. No. 967,788. According to these patents, co- and terpolymerization takes place with the aid of mixed catalysts of compounds of transition metals, e.g., the Ti, V, or Cr halides and/or the V or Cr acetylacetonates or V haloalcoholates with organometallic compounds of metals of group IA, II, or IIIA of the Periodic Table. The yields in this process, however, are extremely poor, in some instances even lower then the amounts of catalyst employed. Such processes are thus completely uninteresting from a technical viewpoint.

OBJECTS OF THE INVENTION

Accordingly, it is a general object of the present invention to provide a process for preparing terpolymers of ethene, butene-1 and butene-2 with good conversion rates.

Another object of this invention is to provide a process for preparing such terpolymers which are substantially free of homopolymer byproducts.

A further object of this invention is to provide such a process for the polymerization of butene-2 wherein isomerization thereof to butene-1 is minimized or avoided.

Upon further study of the specification and appended claims, other objects and advantages of the present invention will become apparent.

SUMMARY OF THE INVENTION

Briefly, the above and other objects of the present invention are attained in one aspect thereof by providing a process for preparing crystalline, thermoplastic, low-pressure terpolymers of ethene with 0.1–5 mol % butene-1 and 0.1–3 mol % butene-2 having a density of 0.94–0.96 g./cm$^3$, which comprises polymerizing a liquid phase monomer mixture consisting essentially of ethene, 0.05–10 mol % butene-1 and 20–98.9 mol % butene-2 with a catalytic amount of a mixed polymerization catalyst comprising a. $TiCl_3 \cdot n\ AlCl_3$ wherein $n$ is 0.2–0.6 and
b. isoprenylaluminum in a molar ratio of Al : Ti of about 2–20 to form said terpolymer.

DETAILED DISCUSSION

The above problems are solved in accordance with the present invention by polymerizing with catalysts of $TiCl_3 \cdot n\ AlCl_3$ ($n = 0.2$ to 0.6) and isoprenylaluminum in a liquid phase containing 0.05–10 mol % butene-1, 20–98.9 mol % butene-2 and optionally a saturated hydrocarbon diluent.

This solution is surprising and could not be foreseen from the present state of the art. For example, U.S. Pat. No. 2,956,989 teaches that a diluent containing butene-2 is entirely unsuitable for the production of copolymers of ethene using catalysts of titanium trichloride and aluminum alkyls, since butene-2 is polymerized to polybutene-2. Also in accordance with work by R. O. Symcox in J. Polymer Sci., Part B, 2, No. 10: 947–949 (1964), the preparation of terpolymers of ethene, butene-1, and butene-2 in $C_4$-cuts containing butene-2 and butene-1 was said to be impossible since butene-2 is isomerized under the influence of Ziegler-Natta catalysts to butene-1 and the latter is then polymerized to polybutene-1. The work by Symcox is confirmed by numerous other publications, e.g., T. Otsu in J. Polymer Sci., A 4, No. 6: 1579–1593 (1966); Masao Iwamoto and Sadao Yuguchi, Bull. Chem. Soc., Japan 40: 159–162 (1967); as well as DOS No. 1,545,042 and French Pat. No. 1,415,239. In contrast to these teachings, however, it has now been found in the present invention that even with high butene-2 concentrations there is no isomerization of butene-2 to butene-1. In this connection, it is further surprising and advantageous that, when activating with isoprenylaluminum, a terpolymer is obtained which is extensively free of homopolymers.

The butene-1 is employed in the liquid phase at polymerization temperatures of 20°–100° C.; at the beginning of the polymerization, the butene-1 is present preferably in an amount of 0.05–2.5 mol %, especially 0.1–1.0 mol %, based on the total monomer feed. In case of polymerization temperatures of 50°–70° C., the butene-1 is employed in the liquid phase at the beginning of polymerization in a concentration of 0.05–5 mol %, especially 0.1–2.5 mol %, and at polymerization temperatures of 20°–50° C., preferably at a concentration of 0.1–10 mol %, especially 0.2–5 mol %.

The butene-2 can be present in the cis- or trans-form as well as in any desired mixtures thereof. Since the butene-2 is copolymerized at an essentially slower rate than butene-1, it is used in great excess and serves simultaneously as the diluent during the polymerization. The ratio of butene-1 to butene-2 is generally 1 : 1,500 to 1 : 8, preferably 1 : 1,000 to 1 : 100.

It is possible to use inert saturated hydrocarbons as a further diluent, e.g., butane, isobutane, propane, pentane, hexane, higher aliphatic and cyclic hydrocarbons, etc.

Among these hydrocarbons, the volatile hydrocarbons have the advantage of being worked up more simply, e.g., by means of being passed through nozzles. The higher-boiling hydrocarbons, such as hexane, have the advantage that the polymerization can take place under a lower pressure.

Butane is particularly suitable, either in the form of n-butane, isobutane, or admixtures thereof in any desired ratio. The very economical technical grade $C_4$-cuts can be utilized in particular. A preferred $C_4$-hydrocarbon mixture consists, for example, of 20–60% butane, 25–50% trans-butene-2, 10–30% cis-butene-2 and 0.1–10% butene-1. The distillation residues obtained during the concentration of butene-1 are a suitable example of such cuts.

As the titanium trichloride, a crystalline or partially crystalline material is employed, for example, $\alpha$-, $\beta$-, $\gamma$-, or $\delta$-titanium trichloride, preferably one obtained by the reduction of titanium tetrachloride with metallic aluminum or with organoaluminum compounds. This titanium trichloride has the composition $TiCl_3 \cdot n\ AlCl_3$ ($n = 0.2$–$0.6$) and is utilized in concentrations of 0.01 to 3, preferably in concentrations of 0.05 to 1 millimole/liter of liquid phase.

The mixed catalysts obtained from titanium trichloride and isoprenylaluminum are preferably used in a molar ratio of Al : Ti amounting to 2–20, especially 5–15, wherein the higher molar ratios are advantageous in case of lower catalyst concentrations of titanium trichloride. During continuous polymerization, both catalyst components are added simultaneously, preferably separately from each other; during discontinuous polymerization the isoprenylaluminum is preferably introduced first. The aforesaid Al : Ti molar ratio excludes the Al in the $TiCl_3 \cdot nAlCl_3$.

The polymerization is conducted at temperatures of about 20°–100° C., preferably 50°–85° C., preferably under pressures of 5–50 atmospheres gauge, especially 10–30 atmospheres gauge. The polymerization takes generally 0.5–10 hours. Shorter polymerization times are preferably employed using higher ethene pressures.

The desired molecular weight can be controlled by adding 0.1 to about 80% by volume of hydrogen. In this connection, the control can also be effected in two stages, optionally adding in the first polymerization stage a small quantity of hydrogen, e.g., 0.1–5% by volume and in the second polymerization stage a larger amount of hydrogen, e.g., 10–80% by volume.

To terminate the polymerization, the catalyst can be decomposed, e.g., by adding water or alcohol; in the case of very low catalyst concentrations, a catalyst decomposition step can be omitted. In the latter case, the working-up step can be limited to a simple procedure of atomization by passing the product through nozzles. The utilization of $C_4$-hydrocarbon mixtures is especially advantageous for this working-up method.

The thus-obtained terpolymers are distinguished by very good Bell test values with high densities and high yield point values. They have a molecular weight distribution with non-uniformities of about 5 to 10. With the aid of hydrogen molecular weight control in two polymerization stages, the molecular weight distribution can be considerably broadened, e.g., to non-uniformities of about 10–40.

The terpolymers have a weight average molecular weight ($M_w$) of about 50,000–300,000, preferably 100,000–200,000 and a number average molecular weight ($M_n$) of about 2,000–30,000, preferably 4,000–20,000. Weight average ($M_w$) and a number average ($M_n$) molecular weights can be determined by various methods known to those skilled in the art, e.g., chromatographic and dispersion methods respectively. Molecular non-uniformity U is calculated according to the formula $$U = \frac{M_w}{M_n} - 1$$

and is a measure of molecular weight distribution. Details regarding the calculations of molecular non-uniformity and the determination of $M_w$ and $M_n$ can be found in the book "Polymer Fractionation" by M. J. R. Cantow (Academic Press).

Terpolymers prepared by the present process have an RSV of 1.5–5.0, preferably 2,5–3,5 dl/g. and viscosity average molecular weights measured according to the formula $$\lg \overline{M_r} = \frac{\lg RSV - \lg 3.26 \times 10^{-4}}{0.77}$$

of about 50,000–260,000, preferably 1000,000–170,000

The terpolymers have preferably a butene-1 content of 0.1–5 mol %, especially 0.2–2%. The butene-2 content is preferably 0.1–3 mol %, especially 0.3–1.5%. The density is 0.94–0.96, especially 0.95–0.96 g./cm³. The terpolymers are 70–90%, preferably 80–90% crystalline, as determined by IR analysis.

The butene-1 content is determined, for example, by measuring the intensity of the ethyl group band in the IR spectrum at a wavenumber of 760 cm⁻¹. The methyl groups are likewise determined with the aid of IR analysis. The butene-2 content can be calculated from the methyl group content, considering the butene-1 proportion determined from the ethyl group content.

The thus-obtained terpolymers are especially suitable for the production of hollow articles, e.g., for detergent packaging and for pipe manufacture. They are likewise suitable for the production of other finished components, such as films and injection-molded articles.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the physical properties set forth were determined according to standard testing techniques. Relative Solution Viscosity (RSV) was determined in an Ostwald-type viscosimeter according to Haake. Viscosity average molecular weight was measured according to $$\lg \overline{M_r} = \frac{\lg/RSV/ - 3.26 \cdot 10^{-4}}{0.77}$$

Weight average ($M_w$) and number average ($M_n$) molecular weights were obtained by chromatographic and dispersion methods respectively. Melt flow values (MF) are calculated from DIN 53 735. Yield stress and yield stress elongation were determined according to DIN 53 455. Ruptural strength and elongation at rupture were measured by DIN 53 455, while tensile impact strength was determined according to DIN 54 448.

IR analysis was conducted with an NaCl prism spectometer (Perkin Elmer M21). The Bell test was conducted according to ASTM-D 1693-60 T.

EXAMPLE 1 a. Production of a TiCl$_3$ · 0.5 AlCl$_3$ Catalyst

One mole of titanium tetrachloride (100% strength) is added dropwise under agitation during 6 hours to a 20% solution, cooled to −5° C., of 1.4 mole of ethyl aluminum sesquichloride (molecular weight 123.7) in hexane. After a post reaction time of 15 hours at −5° C. to +10° C., the catalyst suspension is heat-treated for 6 hours at 150° C. Thereafter, the precipitated catalyst is separated and washed twice with butane. In a practically quantitative yield, 1 mole of a titanium trichloride catalyst is obtained having the composition TiCl$_3$ · 0.52 AlCl$_3$.

b. Polymerization

With the aid of a mixed catalyst of 0.0012 part by weight of this titanium trichloride catalyst and 0.016 part by weight of isoprenylaluminum, 8 parts by weight of ethene is polymerized in 15 parts by weight of a C$_4$-cut containing 40.1% trans-butene-2, 29.6% cis-butene-2, 30.0% butane and 0.25% butene-1, at a temperature of 85° C., a partial hydrogen pressure of 0.05 atmospheres and a total pressure of 12 atm. gauge. After a polymerization time of 2 hours, the thus-obtained polyethylene dispersion is passed through nozzles and atomized into a second container, yielding 7.5 parts by weight of a terpolymer made up of ethene, butene-1, and butene-2 having the following characteristic values:

| | |
|---|---|
| RSV | 2.8 dl./g. $\overline{Mv}$: about 116,000 |
| MFI$_{190/5}$ (melt flow index) | 0.9 g./10 min. |
| Density | 0.956 g./cm$^3$ |
| Yield point | 283 kp./cm$^2$ |
| Elongation at yield point | 17% |
| Ruptural strength (Ultimate tensile strength) | 367 kp./cm$^2$ |
| Elongation at rupture | 756% |
| Bell test at 50° C. | 650 hours |

Molecular non-uniformity $\left( U = \frac{Mw}{Mn} - 1 \right) = 9.87$

| | |
|---|---|
| Mw/5 | 42.3% |
| Mw/5 to Mw | 35.1% |
| >Mw | 22.6% |

IR analysis:

| Double bonds / 1000 C | | |
|---|---|---|
| trans | 0.03 | butene-1 0.6% |
| vinyl | 0.04 | butene-2 0.65% |
| vinylidine | <0.02 | |
| CH$_3$/100 C | 0.77 | |

EXAMPLE 2

With the aid of a mixed catalyst of 0.0012 part by weight of the titanium trichloride catalyst prepared in Example 1(a) and 0.018 part by weight of isoprenylaluminum, 8 parts by weight of ethene is polymerized in 15 parts by weight of a C$_4$-cut containing 40.0% trans-butene-2, 29.4% cis-butene-2, 30.1% butane and 0.55% butene-1, at a temperature of 85° C. for one hour under a total pressure of 11.5 atmospheres gauge. Subsequently, 0.006 part by weight of hydrogen is added thereto. Under a total pressure of 15–16 atmospheres gauge, the polymerization is continued. The ethene is added during the entire polymerization time of 4 hours. Thereafter the polyethylene suspension is passed through nozzles and atomized into a second container. In this way, 7.7 parts by weight of a terpolymer is obtained made up of ethene, butene-1, and butene-2 and having the following characteristics:

| | |
|---|---|
| RSV | 2.8 dl./g. $\overline{Mv}$: about 116,000 |
| MFI$_{190/5}$ | 2.6 g./10 min. |
| Density | 0.956 g./cm$^3$ |
| Yield point | 281 kp./cm$^2$ |
| Ruptural strength | 311 kp./cm$^2$ |
| Elongation at rupture | 805% |
| Bell test at 50° C. | >312 hours |

Molecular non-uniformity $\left( U = \frac{Mn}{Mw} - 1 \right) = 12.4$

| | |
|---|---|
| Mw/5 | 46.1% |
| Mw/5 to Mw | 33.6% |
| >Mw | 20.3% |

IR analysis: Double bonds / 1000 C

| | | | |
|---|---|---|---|
| trans | 0.06 | butene-1 | 1.1% |
| vinyl | 0.05 | butene-2 | 1.4% |
| vinylidene | 0.04 | | |
| CH$_3$/100 C | 1.7 | | |

When adding, in this Example, 0.007 part by weight of hydrogen in place of 0.006 part by weight, a terpolymer is obtained having the following characteristic values:

| | |
|---|---|
| RSV | 2.4 dl./g. $\overline{Mv}$: about 96,500 |
| MFI$_{190/5}$ | 5.1 g./10 min. |
| Density | 0.956 g./cm$^3$ |
| Yield point | 284 kp./cm$^2$ |
| Ruptural strength | 260 kp./cm$^2$ |
| Elongation at rupture | 555% |
| Bell test | 209 hours |
| IR analysis: Double bonds / 1000 C | |

| | | | |
|---|---|---|---|
| trans | 0.06 | butene-1 | 1.0% |
| vinyl | 0.04 | butene-2 | 1.4% |
| vinylidene | 0.02 | | |
| CH$_3$/100 C | 1.6 | | |

These terpolymers are especially suitable for the manufacture of hollow bodies for detergent packaging.

By adding, in this example, 0.005 part by weight of hydrogen instead of 0.006 part by weight, a terpolymer is obtained having the following characteristic values:

| | |
|---|---|
| RSV | 3.8 dl./g. $\overline{Mv}$: about 167,000 |
| MFI$_{190/5}$ | 0.4 g./10 min. |
| Density | 0.957 g./cm$^3$ |
| Yield point | 287 kp./cm$^2$ |
| Ruptural strength | 403 kp./cm$^2$ |
| Elongation at rupture | 774% |
| Bell test | >1000 hours |
| IR analysis: DDouble bonds / 1000 C | |

| | | | |
|---|---|---|---|
| trans | 0.02 | butene-1 | 0.6% |
| vinyl | 0.05 | butene-2 | 0.65% |
| vinylidene | 0.02 | | |
| CH$_3$/100 C | 0.72 | | |

This terpolymer is preferably employed for the manufacture of pipes.

EXAMPLE 3 a. Production of a TiCl$_3$ · 0.33 AlCl$_3$ Catalyst

Two moles of titanium tetrachloride (100% strength) is added dropwise under agitation during 6 hours to a solution, cooled to −5° C., of 1.2 moles of isoprenylaluminum (molecular weight 184) in 1 liter of hexane. Thereafter, the suspension is agitated for 6 hours at 0° C. In a practically quantitative yield, 2 moles of a titanium trichloride catalyst is obtained having the composition of TiCl$_3$ · 0.33 AlCl$_3$.

b. Polymerization

With the aid of a mixed catalyst of 0.0015 part by weight of this titanium trichloride catalyst and 0.016 part by weight of isoprenylaluminum, 11.5 parts by weight of ethene is first polymerized for ½ hour under a pressure of 7–8 atmospheres gauge in 15 parts by weight of a C$_4$-cut containing 38.4% trans-butene-2, 28.8% cis-butene-2, 32.5% butane and 0.3% butene-1 at a temperature of 50° C. Thereafter, 0.002 part by weight of hydrogen is added thereto. Under a total pressure of 8–10 atm. gauge, the polymerization is continued. The ethene is added during the entire polymerization time of 2½ hours. Subsequently, the polyethylene suspension is expanded via nozzles into a second container, thus obtaining 11.1 parts by weight of a terpolymer of ethene, butene-1 and butene-2 with the following properties:

| | |
|---|---|
| RSV | 3.8 dl./g. $\overline{Mv}$: about 167,000 |
| MFI$_{190/5}$ | 0.9 g./10 min. |
| Density | 0.953 g./cm$^3$ |
| Yield point | 265 kp./cm$^2$ |
| Ruptural strength | 337 kp./cm$^2$ |
| Elongation at rupture | 678% |
| Bell test at 50° C. | 197 hours |

Molecular non-uniformity $\left( U = \frac{Mw}{Mn} - 1 \right) = 11.7$

| | |
|---|---|
| Mw/5 | 48.0 |
| Mw/5 to Mw | 34.2 |
| >Mw | 17.8 |

IR analysis: Double bonds / 1000 C

| | | | |
|---|---|---|---|
| trans | 0.03 | butene-1 | 0.5% |
| vinyl | 0.08 | butene-2 | 1.1% |
| vinylidene | 0.02 | | |
| CH$_3$/100 C | 1.1 | | |

This terpolymer is preferably used for the production of hollow articles for detergent packaging.

EXAMPLE 4

When conducting the polymerization at 70° C. following the procedure of Example 3(b) in a C$_4$-cut containing 39.8% trans-butene-2, 29.6% cis-butene-2, 29.9% butane and 0.6% butene-1, a terpolymer is produced having the following characteristic values:

| | |
|---|---|
| RSV | 2.0 dl./g. $\overline{Mv}$: about 77,200 |
| MFI$_{190/5}$ | 5.4 g./10 min. |
| Density | 0.955 g./cm$^3$ |
| Yield point | 276 kp./cm$^2$ |
| Ruptural strength | 366 kp./cm$^2$ |
| Elongation at rupture | 672% |
| IR analysis: Double bonds / 1000 C | |

| | | | |
|---|---|---|---|
| trans | 0.05 | butene-1 | 1.2% |
| vinyl | 0.12 | butene-2 | 1.2% |
| vinylidene | 0.03 | | |
| CH$_3$/100 C | 1.5 | | |

EXAMPLE 5

Following the procedure of Example 1, ethene is polymerized in a C$_4$-cut containing 39.8% trans-butene-2, 29.6% cis-butene-2, 29.9% butane and 0.6% butene-1 at a temperature of 80° C. A terpolymer is thus obtained having the following properties:

| | | | |
|---|---|---|---|
| RSV | 2.8 dl./g. $\overline{Mv}$: 116,000 | | |
| MFI$_{190/5}$ | 0.9 | | |
| Density | 0.950 g./cm$^3$ | | |
| Yield point | 252 kp./cm$^2$ | | |
| Ruptural strength | 363 kp./cm$^2$ | | |
| Elongation at rupture | 716% | | |
| Bell test at 50° C. | 215 hours | | |
| Tensile impact strength (Break tensile strength) | 1068 kp.cm/cm$^2$ | | |
| IR analysis: Double bonds / 1000 C | | | |
| trans | 0.03 | butene-1 | 1.2% |
| vinyl | 0.04 | butene-2 | 1.0% |
| vinylidene | 0.02 | | |
| CH$_3$/100 C | 1.3 | | |

EXAMPLE 6

A polymerization is carried out with 11 parts by weight of ethene in 15 parts by weight of a C$_4$-cut containing 38.4% trans-butene-2, 28.8% cis-butene-2, 32.2% butane and 0.6% butene-1 at a temperature of 80° C. with the aid of a mixed catalyst of 0.0015 part by weight of TiCl$_3$ · 0.3 AlCl$_3$ (commercial aluminum-reduced titanium chloride) and 0.0015 part by weight of isoprenylaluminum. The polymerization is first conducted for one hour under a pressure of 11 atm. gauge. Thereafter, 0.002 part by weight of hydrogen is added and the polymerization continued under a total pressure of 15–16 atm. gauge. The ethene is added during the entire polymerization period of 3 hours. Thereafter, the polyethylene suspension is expanded through nozzles into a second container, thus obtaining 10.6 parts by weight of an ethene-butene-1-butene-2 terpolymer having the following characteristics:

| | | | |
|---|---|---|---|
| RSV | 3.0 dl./g. $\overline{Mv}$ : about 126,000 | | |
| MFI$_{190/5}$ | 1.9 g./10 min. | | |
| Density | 0.953 g./cm$^3$ | | |
| Yield point | 268 kp./cm$^2$ | | |
| Ruptural strength | 312 kp./cm$^2$ | | |
| Elongation at rupture | 617% | | |
| Bell test | 240 hours | | |
| IR analysis: Double bonds / 1000 C | | | |
| trans | 0.03 | butene-1 | 0.8% |
| vinyl | 0.06 | butene-2 | 1.1% |
| vinylidene | <0.02 | | |
| CH$_3$/100 C | 1.3 | | |

EXAMPLE 7

With the aid of a mixed catalyst of 0.0012 part by weight of the titanium trichloride catalyst produced according to Example 1(a) and 0.018 part by weight of isoprenylaluminum, 8 parts by weight of ethene is polymerized in 15 parts by weight of a C$_4$-cut containing 57.4% trans-butene-2, 42.3% cis-butene-2 and 0.3% butene-1 at a temperature of 85° C. for one-half hour under a total pressure of 15 atm. gauge. Thereafter, 0.007 part by weight of hydrogen is added thereto. Under a total pressure of 16–18 atm. gauge, the polymerization is then continued. The ethene is added during the entire polymerization time of 3 hours. Subsequently, the polyethylene suspension is atomized through nozzles into a second container.

Yield: 7.6 parts by weight of a terpolymer of ethene, butene-1, and butene-2 having the following characteristics:

| | |
|---|---|
| RSV | 3.8 dl./g. $\overline{Mv}$: about 167,000 |
| MFI$_{190/5}$ | 1.8 g./10 min. |
| Memory value | 40% |
| Density | 0.960 g./cm$^3$ |
| Yield point | 303 kp./cm$^2$ |
| Ruptural strength | 318 kp./cm$^2$ |
| Elongation at rupture | 753% |
| Critical flexural stress | 356 kp./cm$^2$ |
| Notch impact strength | |
| 20° C. | 12.2 cm.kp/cm$^2$ |
| −20° C. | 6.4 cm.kp/cm$^2$ |
| Bell test at 50° C. | >1000 hours |
| IR analysis: Double bonds / 1000 C | |
| trans 0.04 | butene-1 0.5% |
| vinyl 0.05 | butene-2 1.1% |
| vinylidene 0.03 | |
| CH$_3$/100 C 1.1 | |
| Molecular non-uniformity U = 40.1 | |
| Mw/5 | 68.3% |
| Mw/5 to Mw | 17.0% |
| >Mw | 14.7% |

The terpolymer was used for the manufacture of bottles. The bottles have a neutral taste and thus can also be used for the packaging of foodstuffs.

EXAMPLE 8

With the aid of 0.0015 part by weight of the titanium trichloride catalyst prepared as described in Example 3(a) and 0.016 part by weight of isoprenylaluminum, 11 parts by weight of ethene is polymerized in 10 parts by weight of hexane with 5 parts by weight of a C$_4$-cut containing 45.6% trans-butene-2, 34.2% cis-butene-2, 18,1% butane and 2.1% butene-1 at a temperature of 85° C. first for ½ hour under a pressure of 6–7 atm. gauge. Thereafter, 0.001 part by weight of hydrogen is added and the polymerization continued under 7 atm. gauge. The ethene is added during the entire polymerization time of 3 hours. Subsequently, the polyethylene suspension is separated on a separating device and the polymer is dried, thus obtaining 10.5 parts by weight of a terpolymer of ethene, butene-1, and butene-2 having the following characteristics:

| | |
|---|---|
| RSV | 3.6 dl./g. $\overline{Mv}$: about 156,000 |
| MFI$_{190/5}$ | 1.1 g./10 min. |
| Density | 0.956 g./cm$^3$ |
| Yield point | 281 kp./cm$^2$ |
| Ruptural strength | 321 kp./cm$^2$ |
| Elongation at rupture | 654% |
| Bell test at 50° C. | 1000 hours |
| IR analysis: Double bonds / 1000 C | |
| trans 0.02 | butene-1 1.8% |
| vinyl 0.11 | butene-2 0.3% |
| vinylidene 0.04% | |
| CH$_3$/100 C 0.88 | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope therof, can make various changes and modifications of the invention to adapt it to various usages and conditions.

What is claimed is:

1. A process for preparing crystalline, thermoplastic, low-pressure terpolymers of ethene with 0.1–5 mol % butene-1 and 0.1–3 mol % butene-2 having a density of 0.94–0.96 g./cm$^3$, which comprises:
   polymerizing a liquid phase monomer mixture consisting essentially of ethene, 0.05–10 mol % butene-1 and 20–98.9 mol % butene-2 with a catalytic amount of a particulate mixed polymerization catalyst comprising
   a. TiCl$_3$ · nAlCl$_3$ wherein n is 0.2–0.6, and
   b. isoprenylaluminum in a molar ratio Al : Ti of about 2–20 to form said terpolymer.

2. A process according to claim 1 wherein the ratio of butene-1 to butene-2 in the polymerization mixture is about 1 : 1,000 to 1 : 100.

3. A process according to claim 1 wherein said liquid phase comprises a C$_4$ hydrocarbon mixture consisting essentially of 20–60% butane, 25–50% trans-butene-2, 10–30% cis-butene-2 and 0.1–10% butene-1.

4. A process according to claim 1 wherein the Al : Ti ratio is 5–15.

5. A process according to claim 1 wherein the resultant terpolymer has a molecular weight distribution nonuniformity of 5–40.

* * * * *